US012195105B2

United States Patent
Kwon

(10) Patent No.: US 12,195,105 B2
(45) Date of Patent: Jan. 14, 2025

(54) STEER-BY-WIRE TYPE STEERING APPARATUS

(71) Applicant: HL MANDO CORPORATION, Gyeonggi-do (KR)

(72) Inventor: HyunBi Kwon, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 627 days.

(21) Appl. No.: 17/549,711

(22) Filed: Dec. 13, 2021

(65) Prior Publication Data

US 2022/0185364 A1  Jun. 16, 2022

(30) Foreign Application Priority Data

Dec. 16, 2020 (KR) .................. 10-2020-0176794

(51) Int. Cl.
  *B62D 5/04* (2006.01)
  *B62D 1/06* (2006.01)
  *B62D 1/08* (2006.01)
  *B62D 6/10* (2006.01)

(52) U.S. Cl.
  CPC ............ *B62D 5/0406* (2013.01); *B62D 1/06* (2013.01); *B62D 1/08* (2013.01); *B62D 5/0454* (2013.01); *B62D 5/0463* (2013.01); *B62D 6/10* (2013.01)

(58) Field of Classification Search
  CPC .. B62D 5/0406; B62D 5/0454; B62D 5/0463; B62D 6/10; B62D 6/08
  See application file for complete search history.

(56) References Cited

U.S. PATENT DOCUMENTS

| 6,820,713 | B2 * | 11/2004 | Menjak | B62D 5/006 |
| | | | | 180/402 |
| 6,904,346 | B2 * | 6/2005 | Higashi | B62D 5/0484 |
| | | | | 180/443 |
| 9,988,073 | B2 * | 6/2018 | Shiina | F16D 11/00 |
| 11,465,678 | B2 * | 10/2022 | Kashi | B62D 15/029 |
| 11,661,105 | B2 * | 5/2023 | Kogure | B62D 6/04 |
| | | | | 701/41 |
| 11,945,519 | B2 * | 4/2024 | Kogure | B62D 5/001 |

* cited by examiner

*Primary Examiner* — Kevin Hurley
*Assistant Examiner* — Michael R Stabley
(74) *Attorney, Agent, or Firm* — WOMBLE BOND DICKINSON (US) LLP

(57) ABSTRACT

The present invention provides steer-by-wire steering apparatuses that are capable of generating a counter force for improving steering feel with a simple structure and are particularly suitable for an autonomous vehicle by virtue of a reduced size.

12 Claims, 6 Drawing Sheets

STEER-BY-WIRE TYPE STEERING APPARATUS

CROSS-REFERENCE TO RELATED APPLICATION

This application claims the priority benefit of Republic of Korea Patent Application No. 10-2020-0176794, filed on Dec. 16, 2020 in the Korean Intellectual Property Office, the disclosure of which is incorporated herein by reference in its entirety.

BACKGROUND

Field of the Disclosure

The present disclosure relates to a vehicle steering apparatus, and more specifically, to a steer-by-wire steering apparatus that is capable of generating a counter force for improving steering feel with a simple structure and is particularly suitable for an autonomous vehicle by virtue of a reduced size.

Description of the Background

A steer-by-wire steering apparatus is a type of electrical power assisted steering apparatus, and is an apparatus capable of steering a vehicle by using electrical power without a mechanical connection such as a steering column, a universal joint, and the like between a steering wheel and a front wheel steering apparatus.

The steer-by-wire steering apparatus includes an input-side mechanism and an output-side mechanism. The input-side mechanism receives the manipulation of the steering wheel (i.e., torque) performed by a driver, and includes a steering feedback actuator (SFA) capable of generating a counter force for providing steering feel to the driver taking account of characteristics of the steer-by-wire steering apparatus that does not have a mechanical connection between a steering shaft and vehicle wheels. The output-side mechanism includes a road wheel actuator (RWA) capable of steering the vehicle wheels based on steering information of the driver and traveling information of the vehicle. Therefore, the steer-by-wire steering apparatus can achieve optimal steering performance through one or more electronic control units (ECU) programmed to perform corresponding functions.

In autonomous vehicles that have been developed very rapidly in recent years, attempts have been made to reduce a size of a steering system to ensure a convenient space for the driver during autonomous driving. In line with this trend, in the steer-by-wire steering apparatus, attempts have been made to simplify the input-side mechanism.

SUMMARY

To satisfy these needs, embodiments of the present disclosure provide steer-by-wire steering apparatuses that are capable of generating a counter force for improving steering feel with a simple structure and are particularly suitable for an autonomous vehicle by virtue of a reduced size.

According to aspects of the present disclosure, a steer-by-wire steering apparatus is provided that includes a fixed shaft mounted on a vehicle body, a housing rotatably coupled to the fixed shaft, a steering wheel coupled to the housing, a motor for generating a counter force by applying a torque to the housing, a sensor for measuring a steering angle of the steering wheel, and an electronic control unit that is connected to the sensor and controls the motor.

According to embodiments of the present disclosure, it is possible to provide steer-by-wire steering apparatuses that are capable of generating a counter force for improving steering feel with a simple structure and are particularly suitable for an autonomous vehicle by virtue of a reduced size.

BRIEF DESCRIPTION OF THE DRAWINGS

The accompanying drawings, which are included to provide a further understanding of the disclosure and are incorporated in and constitute apart of the disclosure, illustrate aspects of the disclosure and together with the description serve to explain the principle of the disclosure. In the drawings.

DETAILED DESCRIPTION

Figure 1:
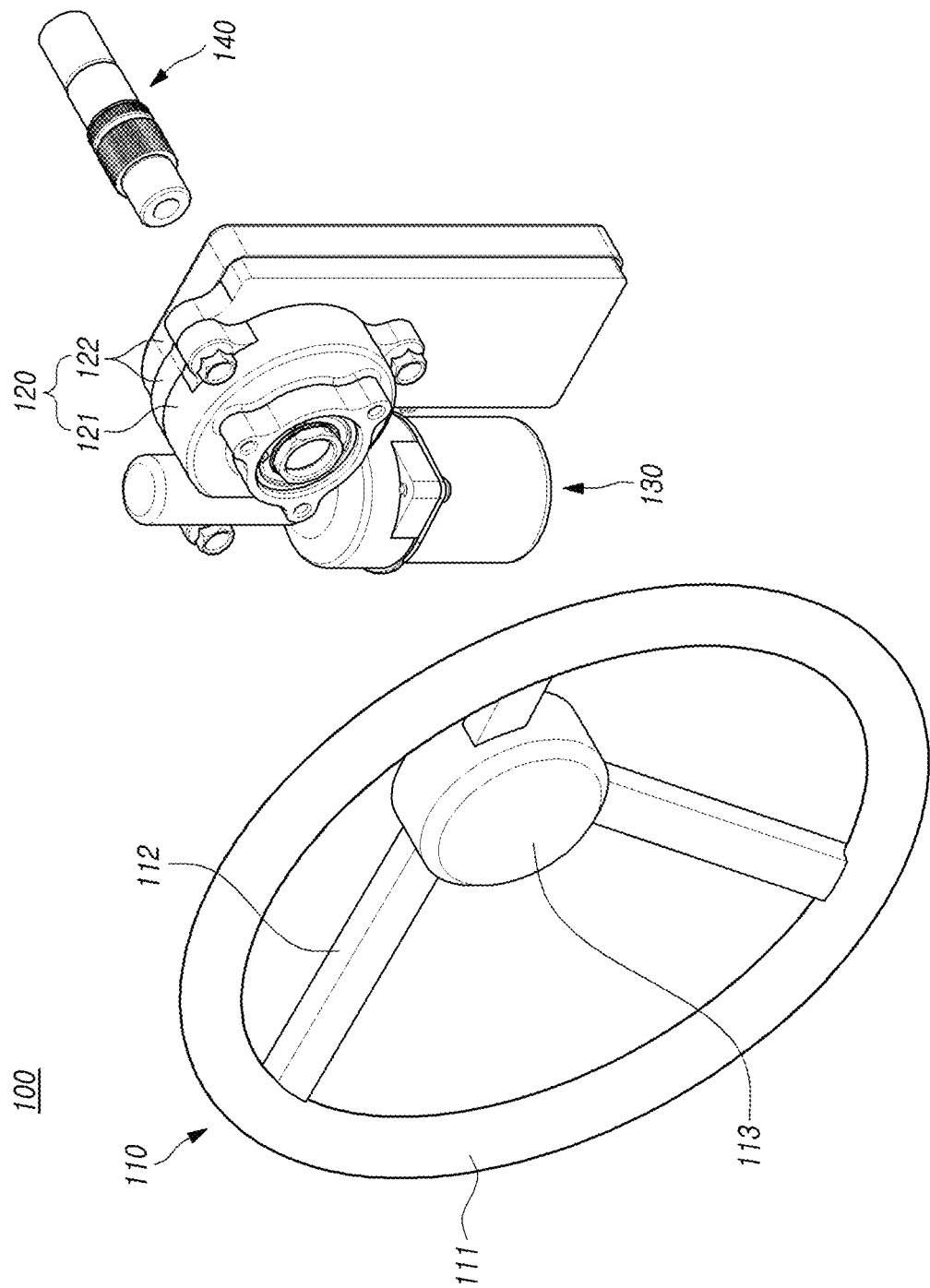
FIG. 1 is an exploded perspective view of a steer-by-wire steering apparatus according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
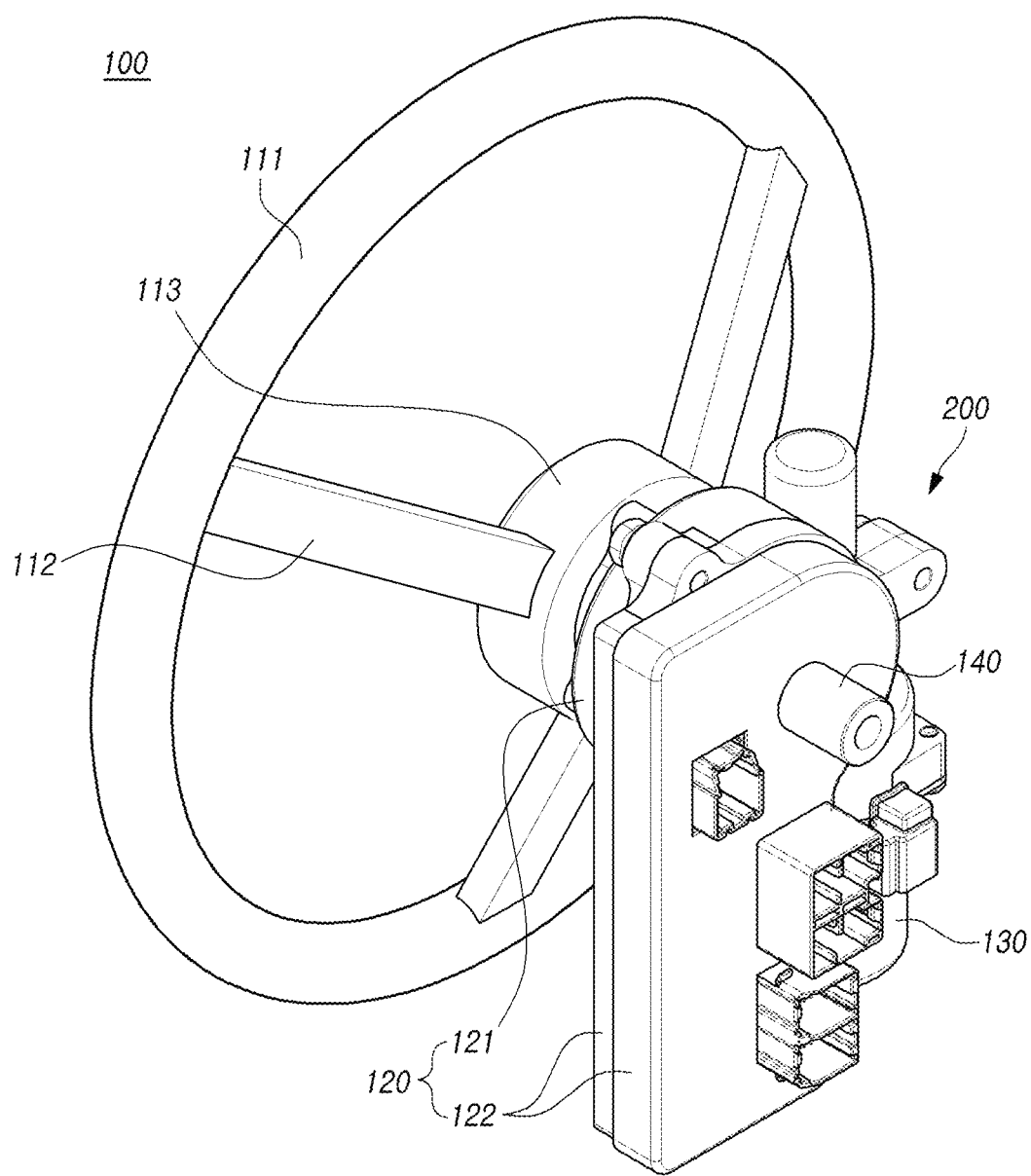
FIG. 2 is a perspective view illustrating a structure in which components of FIG. 1 are combined.
Figure 3:
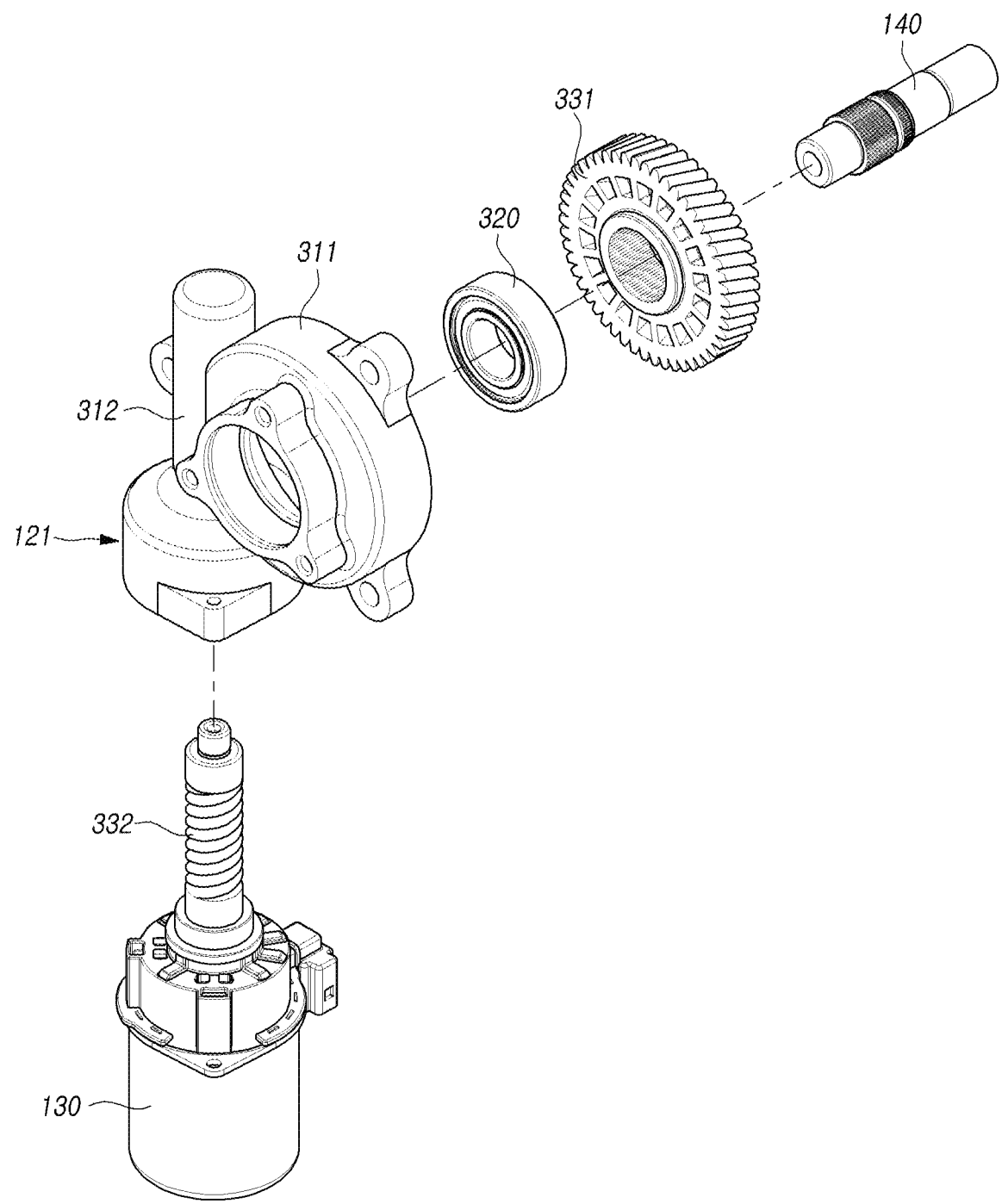
FIGS. 3 and 4 are exploded perspective views for a portion of FIG. 1.
Figure 4:
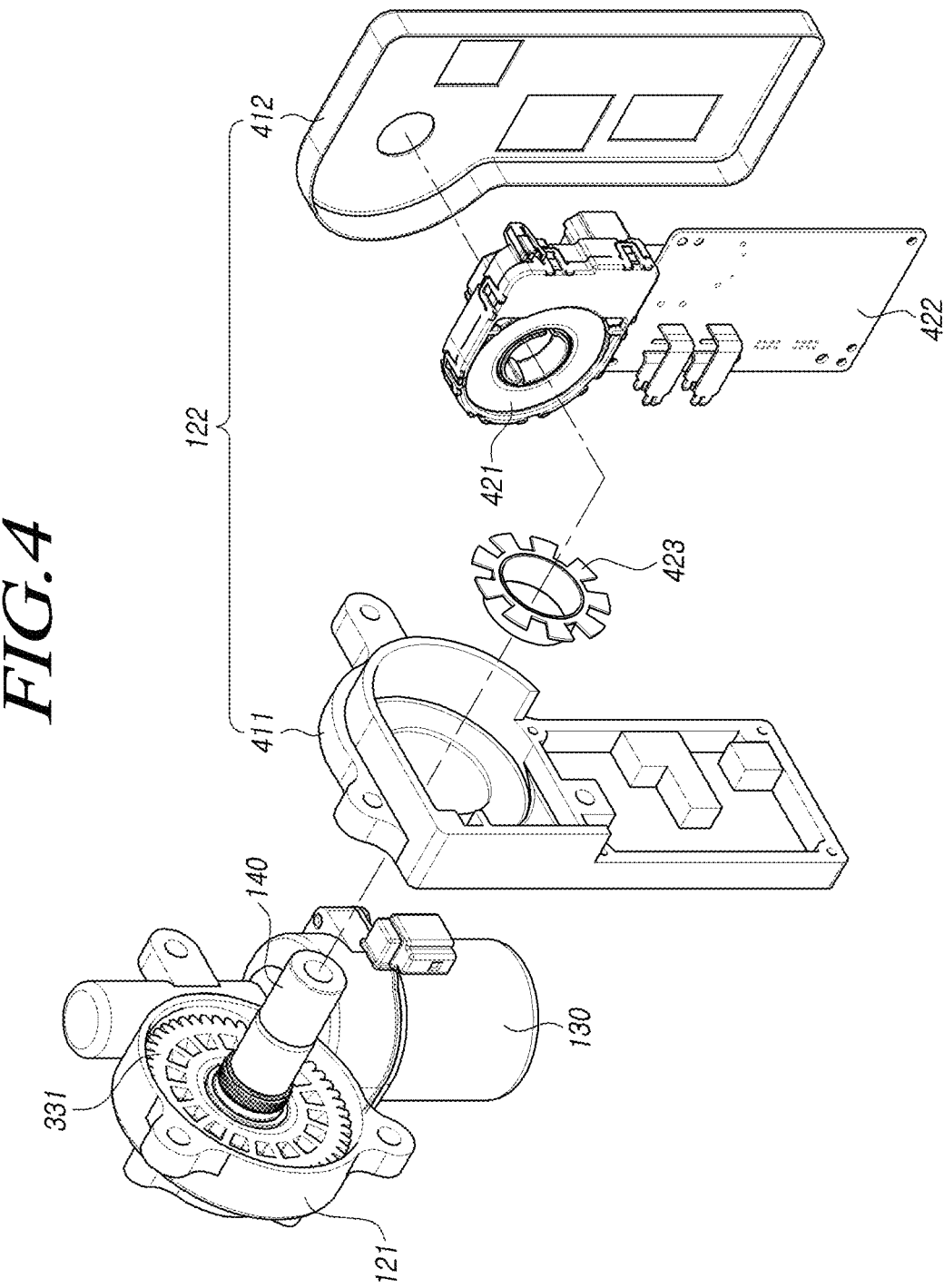
Figure 5:
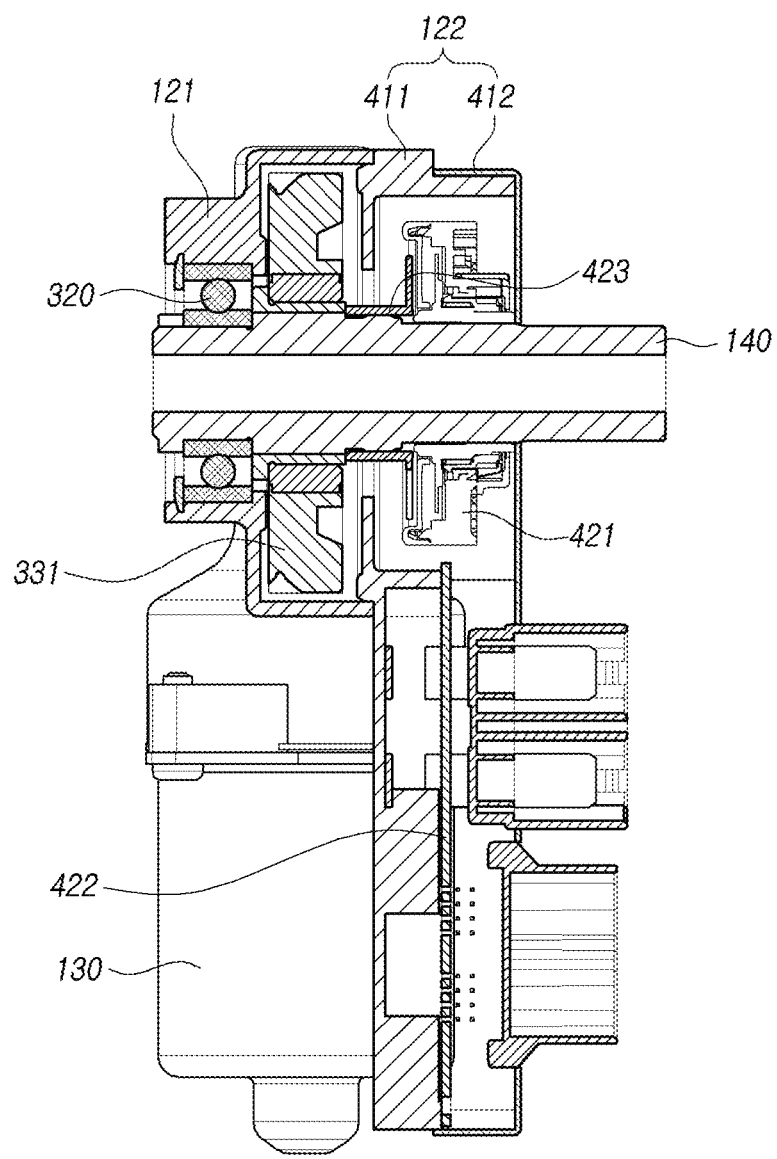
FIG. 5 is a cross-sectional view of the steering apparatus illustrated in FIG. 2.
Figure 6:
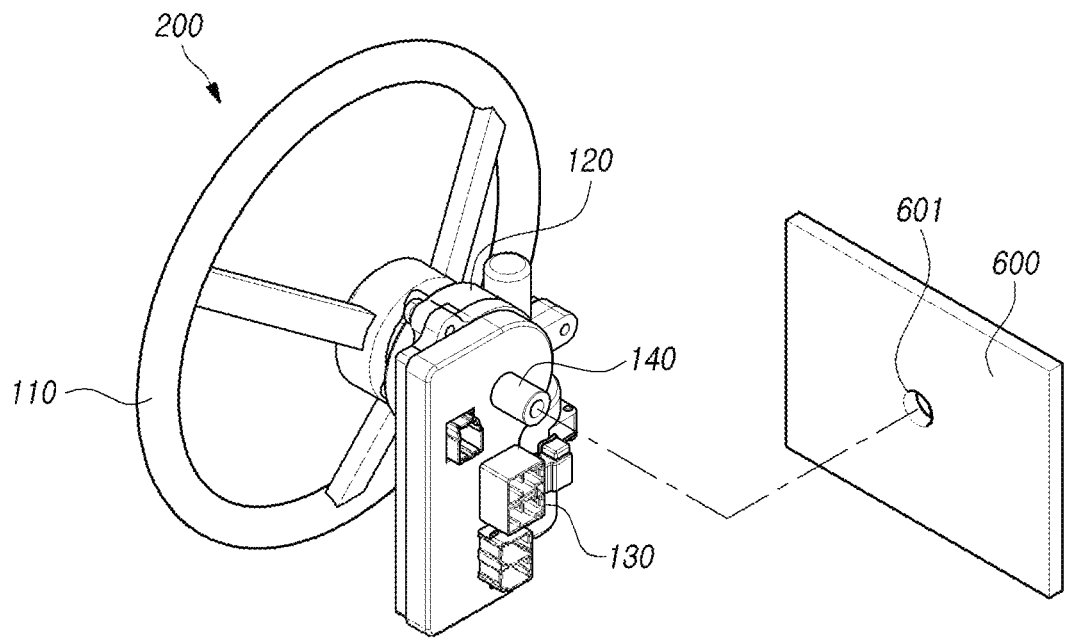
FIG. 6 illustrates operations of the steer-by-wire steering apparatus according to aspects of the present disclosure.
Figure 6:
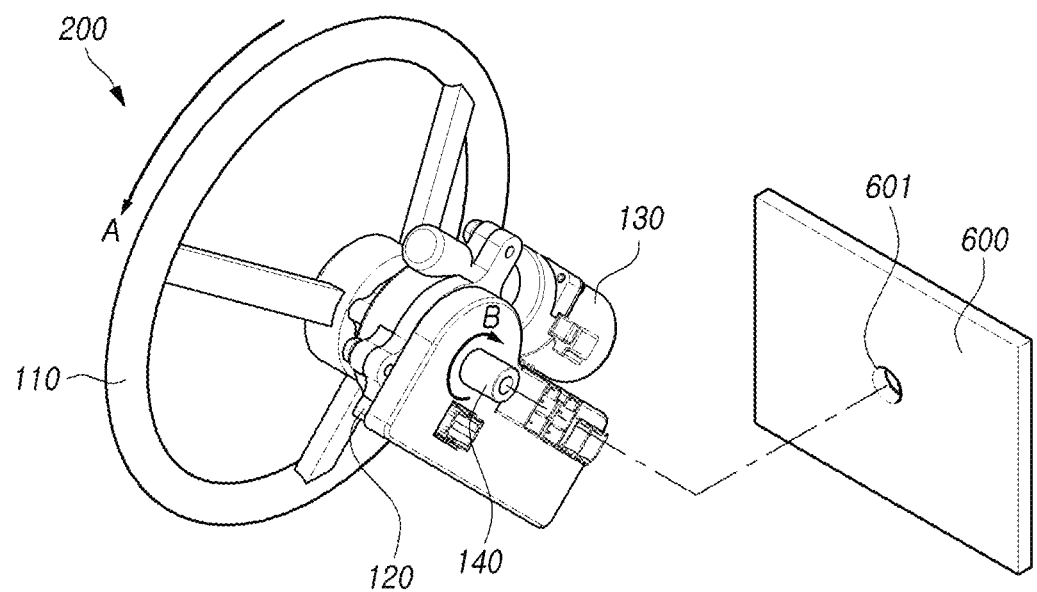

FIG. 1 is an exploded perspective view of a steer-by-wire steering apparatus according to aspects of the present disclosure; FIG. 2 is a perspective view illustrating a structure in which components of FIG. 1 are combined; FIGS. 3 and 4 are exploded perspective views for a portion of FIG. 1; FIG. 5 is a cross-sectional view of the steering apparatus illustrated in FIG. 2; and FIG. 6 illustrates operations of the steer-by-wire steering apparatus according to aspects of the present disclosure.

The steer-by-wire steering apparatus 100 according to aspects of the present disclosure includes a fixed shaft 140 mounted on a vehicle body, a housing 120 rotatably coupled to the fixed shaft 140, a steering wheel 110 coupled to the housing 120, a motor 130 for generating a counter force by applying a torque to the housing 120, a sensor 421 for measuring a steering angle of the steering wheel 110, and an electronic control unit 422 that is connected to the sensor 421 and controls the motor 130.

Referring to FIGS. 1 and 2, the fixed shaft 140 is a component for supporting the turning of the steering wheel 110 and the housing 120, and is fixed to the vehicle body in order not to be turned. The steering wheel 110 and the housing 120 can rotate about the fixed shaft 140 as a central axis. Although not shown in the figures, a structure for providing telescope and tilt functions to the fixed shaft 140 may be further included so that a driver can adjust a position of the steering wheel 110.

The fixed shaft 140 includes an edge coupled to the vehicle body, and the edge of the fixed shaft 140 coupled to the vehicle body protrudes from the housing 120. That is, the edge of the fixed shaft 140 protrudes from the housing 120 and is coupled to the vehicle body. The edge of the fixed shaft 140 passes through a cover housing 122, which is described below in further detail, and protrudes in a direction toward the front of the vehicle. The fixed shaft 140 may be coupled to a portion of the vehicle body located in front of the driver compartment of a vehicle. For example, the edge of the fixed shaft 140 may be coupled to a dashboard 600. In this case, a hole 60 into which the edge of the fixed shaft 140 is inserted and fixed may be formed in the dashboard 600 (See FIG. 6).

The housing 120 may be rotatably coupled to the fixed shaft 140. The housing 120 may be coupled to the fixed shaft 140 via a bearing 320 (see FIGS. 3 and 5). That is, the fixed shaft 140 is fixed to the vehicle body in order not to be rotated, and provides a rotation shaft for the housing 120. In this case, the housing 120 may be rotatably coupled to the fixed shaft 140 via the bearing 320.

The steering wheel 110 may be coupled to the housing 120. That is, the steering wheel 110 may not be directly coupled to the fixed shaft 140, and maybe coupled to the fixed shaft 140 via the housing 120 instead. Accordingly, as the steering wheel 110 is manipulated by the driver, the housing 120 can turn together with the steering wheel 110 about the fixed shaft 140 (see FIG. 6).

The steering wheel 110 may include a rim 111, one or more spokes 112, and a wheel base 113, and the housing 120 may be coupled to the wheel base 113. More specifically, the housing 120 may be coupled to the rear surface of the wheelbase 113. That is, the housing 120 may be coupled to the steering wheel 110 in an opposite position of the driver. Further, the housing 120 may be bolted to the wheel base 113. Accordingly, the steering wheel 110 and the housing 120 may be fixed to each other in the circumferential direction.

That is, as the steering wheel 110 is turned by a driver, the housing 120 is turned together with the steering wheel 110. In this situation, a counter force generated by the application of a torque to the housing 120 by the motor 130 is transmitted to the steering wheel 110, and thereby, corresponding steering feel can be provided to the driver. The motor 130 may be coupled to the housing 120, and thereby, can rotate together with the steering wheel 110 and the housing 120. The motor 130 can apply a torque to the housing 120 via a first gear 331 and a second gear 332, which will be described below in further detail.

Referring to FIG. 4, the sensor 421 can measure a steering angle of the steering wheel 110. The electronic control unit 422 may be connected to the sensor 421 and can control the motor 130. The sensor 421 can derive a steering angle of the steering wheel 110 by measuring a rotation angle of the housing 120 with respect to the fixed shaft 140, which will be described below in further detail. The electronic control unit 422 can receive the steering angle derived by the sensor 421 and traveling information (e.g., a vehicle speed, etc.) from various types of sensors located in a vehicle, and control the motor 130 based on the received information. Accordingly, the electronic control unit 422 can provide steering feel to a driver and transmit a signal to the output-side mechanism to steer the vehicle wheels.

The fixed shaft 140, the housing 120, the steering wheel 110, the motor 130, the sensor 421 and the electronic control unit 422 employed in the steer-by-wire steering apparatus 100 according to aspects of the present disclosure may be integrally assembled to form a steering wheel module 200 as one piece.

That is, in the conventional steering apparatus, a steering column is mounted on the vehicle and the steering wheel is coupled to the steering shaft of the steering column. In contrast, in the steer-by-wire steering apparatus 100 according to aspects of the present disclosure, the fixed shaft 140, the housing 120, the steering wheel 110, the motor 130, the sensor 421, and the electronic control unit 422 are assembled to form the steering wheel module 200, and the steering wheel module 200 can be mounted as the edge of the fixed shaft 140 is fixed to the vehicle body. Accordingly, the structure of the steer-by-wire steering apparatus 100 according to aspects of the present disclosure can be simplified and have a reduced size when compared to the conventional steering device including the steering column. That is, the steer-by-wire steering apparatus 100 according to aspects of the present disclosure can include the steering wheel module 200 that is capable of substantially equally performing the function of the conventional steer-by-wire steering apparatus and is configured to have a simpler and more compact structure.

Referring to FIGS. 3 and 5, the steer-by-wire steering apparatus 100 according to aspects of the present disclosure may include the first gear 331 coaxially coupled to the fixed shaft 140, and the second gear 332 coupled to the housing 120 by being engaged with the first gear 331 and connected to the motor 130.

The first gear 331 is fixed by being coupled to the fixed shaft 140 in order not to be rotated. As shown in the figures, the first gear 331 may be coupled to the outer peripheral surface of the fixed shaft 140 through a serration.

The second gear 332 is engaged with the first gear 331. Accordingly, as the second gear 332 rotates about the axis of the second gear 332, the second gear 332 is configured to rotate around the axis of the first gear 331 (the axis of the fixed shaft 140). That is, the second gear 332 can rotate about the axis of the second gear 332 and revolve around the axis of the first gear 331.

The second gear 332 may be coupled to the housing 120 and connected to the motor 130. That is, the torque supplied by the motor 130 to rotate the second gear 332 can be transmitted to the housing 120 by the revolution of the second gear 332 around the axis of the first gear 331.

In one embodiment, the housing 120 may include a gear housing 121 for accommodating the first gear 331 and the second gear 332. That is, the steering wheel module 200 may further include the first gear 331 and the second gear 332. While the first gear 331 and the gear housing 121 may not supported by each other in the circumferential direction, the second gear 332 and the gear housing 121 may be supported by each other in the circumferential direction. The gear housing 121 may be coupled to the fixed shaft 140 via a bearing 320.

Referring to FIG. 6, when the steering wheel 110 is manipulated by a driver, as the gear housing 121 accommodating the first gear 331 and the second gear 332 is not supported by the first gear 331 in the circumferential direction, therefore, the housing 120 can rotate about the fixed shaft 140. Further, as the second gear 332 is supported by the gear housing 121 in the circumferential direction, the second gear 332 can revolve around the axis of the first gear 331 and rotate about the axis of the second gear 332 at the same time. As the motor 130 controlled by the electronic control unit 422 rotates the second gear 332, the torque of the motor 130 is applied to the housing 120, thereby, resulting in a counter force being provided to the driver. That is, as the motor 130 applies a torque to the second gear 332 in a direction opposite to a direction (as shown by the arrow labeled A) in which the second gear 332 rotates by the manipulation of the steering wheel 110 by a driver, therefore, a corresponding counter torque can be provide the driver (as shown by the arrow labeled B).

As shown in the figures, the first gear 331 may be a worm wheel, and the second gear 332 may be a worm shaft. The worm wheel may be coupled to the outer circumferential surface of the fixed shaft 140, resulting in the worm wheel being fixed in order not to be rotated, The worm shaft maybe engaged with the outer circumferential surface of the worm wheel, and can rotate about the axis of the worm shaft and revolve around the axis of the worm wheel. The gear housing 121 may include a worm wheel accommodator 311 for accommodating the worm wheel and a worm shaft accommodator 312 for accommodating the worm shaft. The worm wheel accommodator 311 may be configured not to be supported by the worm wheel in the circumferential direction, and the worm shaft accommodator 312 may be configured to be supported by the worm shaft in the circumferential direction. Although not shown in figures, the worm shaft may be coupled to the worm shaft accommodator 312 via a bearing, and thus, rotation of the worm shaft can be supported by the worm shaft accommodator. The revolution of the worm shaft may be supported by a bearing 320 for coupling the gear housing 121 to the fixed shaft 140.

Further, the motor 130 may be coupled to the housing 120. More specifically, the motor 130 may be coupled to the worm shaft accommodator 312 of the gear housing 121 and can rotate about the fixed shaft 140 together with the steering wheel 110 and the housing 120. The motor shaft of the motor 130 maybe coupled to the worm shaft via a damping coupler or maybe integrated with the worm shaft.

Meanwhile, referring to FIGS. 4 and 5, the sensor 421 can measure a rotation angle of the housing 120 with respect to the fixed shaft 140. That is, a sensor rotor 423 opposite to the sensor 421 may be coupled to the fixed shaft 140 in order not to be rotated, and the sensor 421 can rotate together with the steering wheel 110 by being supported by the housing 120. Accordingly, the sensor 421 can derive a steering angle of the steering wheel 110 by measuring a rotation angle of the housing 120 with respect to the fixed shaft 140.

The housing 120 may include a cover housing 122 for accommodating the sensor 421 and the electronic control unit 422. That is, the steering wheel module 200 may further include the sensor 421 and the electronic control unit 422. The cover housing 122 can accommodate the first cover 411 coupled to the gear housing 121, the sensor 421 and the electronic control unit 422, and may include a second cover 412 coupled to the first cover 411. The edge of the fixed shaft 140 may protrude by passing through the first cover 411 and the second cover 412. In addition, a connector of the electronic control unit 422 may be disposed to protrude from the second cover 412, and thus, the electronic control unit 422 may be connected to the output-side mechanism.

The steer-by-wire steering apparatuses having the structures and/or configurations according to the embodiments described above are capable of generating a counter force for improving steering feel with a simple structure and are particularly suitable for an autonomous vehicle by virtue of a reduced size.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer-by-wire steering apparatus comprising:
a fixed shaft mounted on a vehicle body;
a housing rotatably coupled to the fixed shaft;
a steering wheel coupled to the housing;
a motor for generating a counter force by applying a torque to the housing,
a sensor for measuring a steering angle of the steering wheel; and an electronic control unit that is connected to the sensor and controls the motor.

2. The steer-by-wire steering apparatus according to claim 1, wherein the fixed shaft comprises an edge that protrudes from the housing and is coupled to the vehicle body.

3. The steer-by-wire steering apparatus according to claim 1, wherein the housing is coupled to the fixed shaft via a bearing.

4. The steer-by-wire steering apparatus according to claim 1, wherein the steering wheel comprises a rim, one or more spokes and a base, and
wherein the housing is coupled to the base.

5. The steer-by-wire steering apparatus according to claim 1, wherein the motor is coupled to the housing.

6. The steer-by-wire steering apparatus according to claim 1, wherein the fixed shaft, the housing, the steering wheel, and the motor are integrally assembled to form a steering wheel module.

7. The steer-by-wire steering apparatus according to claim 1, further comprising:
a first gear coaxially coupled to the fixed shaft; and
a second gear coupled to the housing by being engaged with the first gear and connected to the motor.

8. The steer-by-wire steering apparatus according to claim 7, wherein the housing comprises a gear housing for accommodating the first gear and the second gear.

9. The steer-by-wire steering apparatus according to claim 8, wherein the first gear and the gear housing are not supported by each other in a circumferential direction, and the second gear and the gear housing are supported by each other in the circumferential direction.

10. The steer-by-wire steering apparatus according to claim 8, wherein the first gear is a worm wheel, and the second gear is a worm shaft.

11. The steer-by-wire steering apparatus according to claim 1, wherein the sensor measures a rotation angle of the housing with respect to the fixed shaft.

12. The steer-by-wire steering apparatus according to claim 1, wherein the housing comprises a cover housing for accommodating the sensor and the electronic control unit.

* * * * *